(12) United States Patent
Foley et al.

(10) Patent No.: US 9,376,264 B1
(45) Date of Patent: Jun. 28, 2016

(54) CONVEYOR BELT CLEANING APPARATUS

(71) Applicants: Shawn Michael Foley, Stony Plain (CA); Alexander Roy Schaerer, Stony Plain (CA); Dennis Joseph Satz, Stony Plain (CA)

(72) Inventors: Shawn Michael Foley, Stony Plain (CA); Alexander Roy Schaerer, Stony Plain (CA); Dennis Joseph Satz, Stony Plain (CA)

( * ) Notice: Subject to any disclaimer, the term of this patent is extended or adjusted under 35 U.S.C. 154(b) by 0 days.

(21) Appl. No.: 14/572,862

(22) Filed: Dec. 17, 2014

(51) Int. Cl.
*B65G 45/12* (2006.01)
*B65G 45/24* (2006.01)

(52) U.S. Cl.
CPC ....................... *B65G 45/12* (2013.01)

(58) Field of Classification Search
CPC ................................ B65G 45/12; B65G 45/24
USPC .................... 198/493, 497, 498, 499
See application file for complete search history.

(56) References Cited

U.S. PATENT DOCUMENTS

| | | | |
|---|---|---|---|
| 2,514,780 A | 7/1950 | McGovern | |
| 4,269,301 A | 5/1981 | Gibbs | |
| 4,529,084 A * | 7/1985 | Zhang | B65G 45/16 198/499 |
| 4,633,999 A | 1/1987 | Perneczky | |
| 4,662,507 A * | 5/1987 | Veenhof | B65G 45/12 15/256.5 |
| 4,787,500 A * | 11/1988 | Holz | B65G 45/12 15/256.5 |
| 4,821,867 A * | 4/1989 | Veenhof | B65G 45/12 15/256.5 |
| 4,854,443 A | 8/1989 | Gordon | |
| 4,907,690 A * | 3/1990 | Spohn | B65G 45/14 198/498 |
| 4,917,231 A | 4/1990 | Swinderman | |
| 5,014,844 A | 5/1991 | Anttonen | |
| 5,016,476 A * | 5/1991 | Peterson | G01M 11/088 73/829 |
| 5,031,750 A | 7/1991 | Barnes | |
| 5,117,967 A | 6/1992 | Morrow et al. | |
| 5,222,589 A | 6/1993 | Gordon | |
| 5,301,797 A | 4/1994 | Hollyfield, Jr. et al. | |

(Continued)

FOREIGN PATENT DOCUMENTS

| | | |
|---|---|---|
| EP | 0497324 B1 | 8/1992 |
| EP | 0573688 A1 | 12/1993 |

OTHER PUBLICATIONS

International Search Report and The Written Opinion of the corresponding International Application No. PCT/CA2015/051339 Filed Dec. 17, 2015.

*Primary Examiner* — Douglas Hess
(74) *Attorney, Agent, or Firm* — McQIPLaw; Jeffrey McQuiston

(57) ABSTRACT

The present invention is directed to a conveyor belt cleaning apparatus comprising a frame having a front side, a rear side, two lateral sides and one or more openings located between the front side, the rear side and the lateral sides; a first scraping blade and a second scraping blade, wherein each of the scraping blades is positioned between the lateral sides of the frame, and wherein the second scraping blade is rearward of the first scraping blade; and means for securing the frame to the underside of a conveyor belt assembly such that the first scraping blade and the second scraping blade make contact with the conveyor belt of the conveyor belt assembly.

18 Claims, 2 Drawing Sheets

(56) References Cited

U.S. PATENT DOCUMENTS

| | | | |
|---|---|---|---|
| 5,518,107 A * | 5/1996 | Schwarze | B65G 45/16 198/499 |
| 5,573,102 A | 11/1996 | Puchalla | |
| 5,950,803 A * | 9/1999 | Schwarze | B65G 45/16 198/497 |
| 6,076,656 A | 6/2000 | Mat | |
| 6,152,290 A | 11/2000 | Mott et al. | |
| 6,349,816 B1 * | 2/2002 | Tenzer | B65G 45/12 198/497 |
| 6,354,428 B1 * | 3/2002 | Gibbs | B65G 45/16 198/497 |
| 6,401,911 B1 * | 6/2002 | Swinderman | B65G 45/16 198/499 |
| 6,581,754 B2 * | 6/2003 | Law | B65G 45/16 15/256.51 |
| 6,612,419 B1 | 9/2003 | Watson | |
| 6,644,463 B2 | 11/2003 | Mott | |
| 6,820,734 B1 | 11/2004 | Gilbert et al. | |
| 6,971,503 B2 * | 12/2005 | Thompson | B65G 45/24 198/494 |
| 6,986,418 B2 | 1/2006 | Swinderman et al. | |
| 7,007,794 B2 | 3/2006 | Waters et al. | |
| 7,055,675 B2 | 6/2006 | Behymer et al. | |
| 7,216,756 B2 | 5/2007 | Swinderman | |
| 7,308,980 B2 | 12/2007 | Peterson et al. | |
| 7,549,532 B2 | 6/2009 | Ostman | |
| 7,556,140 B2 * | 7/2009 | Swinderman | B65G 45/16 198/497 |
| 7,987,966 B2 * | 8/2011 | DeVries | B65G 45/16 198/497 |
| 8,528,724 B2 * | 9/2013 | Dunnwald | B65G 45/16 198/497 |
| 2012/0247922 A1 | 10/2012 | Waters | |

* cited by examiner

CONVEYOR BELT CLEANING APPARATUS

BACKGROUND OF THE INVENTION

1. Technical Field

The present invention relates to conveyor belt cleaning apparatus for attachment near the discharge end of a conveyor belt assembly for cleaning away debris adhering to the conveyor belt.

2. Description of Related Art

A primary function of conveyor belt cleaners is to remove debris that remains on the conveyor belt after the belt has rounded the drum at the discharge end of the conveyor (i.e., "carry-back debris" or simply "carry-back") so as to cause the conveyor belt apparatus malfunction or clog. The main drawback of previously known conveyor belt cleaners is that either they do not remove sufficient "carry-back" from the underside of the conveyor belt or that the debris removed tends to accumulate on the body and/or blade of the cleaner itself and thereby reduces its effectiveness. In either case, the conveyor operation must be stopped repeatedly so that maintenance operations can be performed to allow service personnel to clean the conveyor belt or the conveyor belt cleaner, as the case may be.

U.S. Pat. No. 5,014,844 describes a conveyor belt cleaner that is made of body and a plurality of cleaner elements attached side by side to the body. Each cleaner element has a blade, a blade holder attached to the body and a torsion spring located between the blade and the blade holder. The blade consists of an upper part that is pressed against the underside of the conveyor belt and a lower part that is attached to the torsion spring. The described conveyor belt cleaner consists of a single row of cleaning blades.

U.S. Pat. No. 5,222,589 describes a conveyor belt cleaner that consists of a single blade. The blade is curved and positioned at the underside of the discharge end of the conveyor belt. The curved shape of the blade not only scrapes the conveyer belt but also protects against the blade damaging the belt.

U.S. Pat. No. 5,031,710 describes a conveyor belt cleaner that is attached to the belt and employs the use of a scraper and several nozzles that dispense liquid. A beam that acts as a liquid reservoir carries liquid from a liquid source to the nozzles. Theses nozzles are placed transversely below the conveyer belt along with the scraper. The liquid is sprayed to remove debris from the conveyer belt before the scraper removes carry-back debris.

U.S. Pat. No. 4,269,301 describes a conveyor belt cleaner that consists of three scraper blades positioned against a conveyor belt at the discharge end drum. Each blade is secured to an operating lever which may be rotated by an air cylinder and thereby flex the scraper blade against the conveyor belt. The pressures in the three separate air cylinders are adjusted so that the first scraper blade receives the greatest flexing force, the second scraper blade a lesser flexing force, and the third scraper blade the least flexing force. The differential flexing forces is accomplished by supplying the air cylinders through progressively differently set pressure reducing valves connected to a common compressed air main.

Thus, there exists a need for a simple, conveyer belt cleaner without moving parts or power supply that effectively removes carry-back debris without itself requiring frequent maintenance to remove accumulated debris. The present invention substantially fulfills this need.

SUMMARY OF THE INVENTION

The present invention is directed to a conveyor belt cleaning apparatus comprising a frame having a front side, a rear side, two lateral sides and one or more openings located between the front side, the rear side and the lateral sides; a first scraping blade and a second scraping blade, wherein each of the scraping blades is positioned between the lateral sides of the frame, and wherein the second scraping blade is rearward of the first scraping blade; and means for securing the frame to the underside of a conveyor belt assembly such that the first scraping blade and the second scraping blade make contact with the conveyor belt of the conveyor belt assembly.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged view of scraping blade of the invention.

In the following description of the invention similar reference characters refer to similar parts throughout the several views of the drawings.

DETAILED DESCRIPTION

Figure 1:
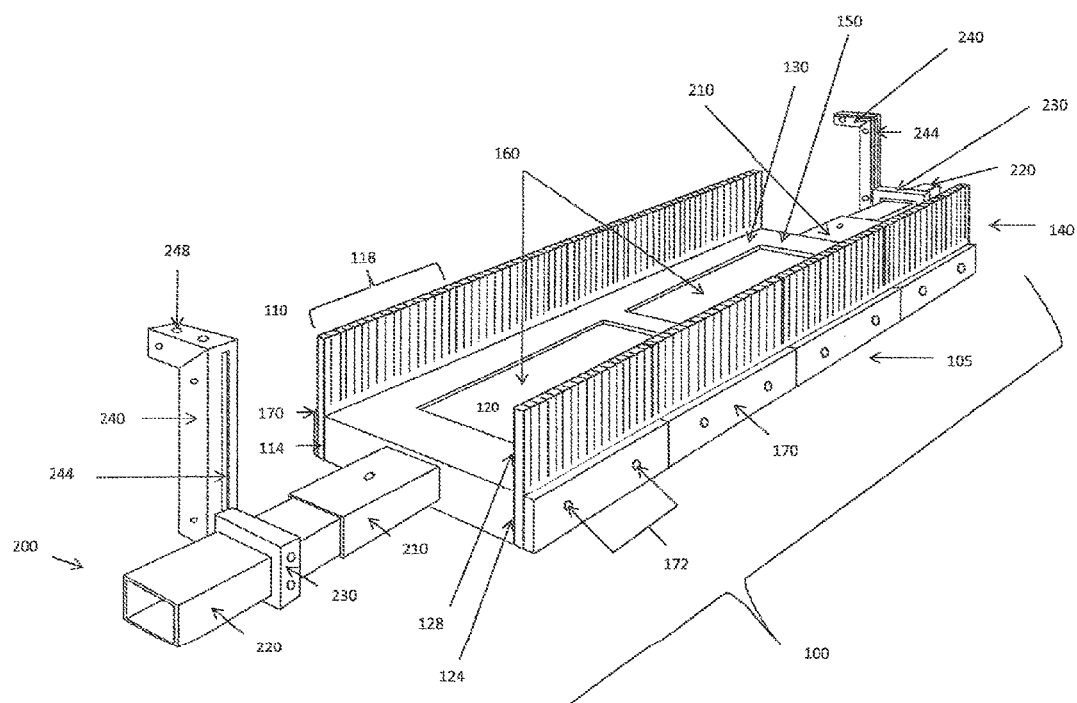
FIG. 2 1 is a top view of a conveyer belt cleaning apparatus of the invention.

FIG. 1 shows Conveyer belt cleaning apparatus 100 of the present invention. Frame 105 has forward side 130, rearward side 140 and lateral sides 150. First scraping blade 110, which includes a base 114 and a plurality of fingers 118, is secured to forward side 130 using a mounting plate 170 and mounting plate bolts (not shown). As shown, conveyor belt cleaning apparatus 100 includes a plurality of first scraping blades 110, positioned side-by-side, secured to forward side 130. Second scraping blade 120, which includes a base 124 and a plurality of fingers 128, is secured to rearward side 140 using mounting plates 170 and mounting plate bolts 172. Likewise, as shown, conveyor belt cleaning apparatus 100 includes a plurality of second scraping blades 120, positioned side-by-side, secured to rearward side 140. In operation, frame openings 160 allow debris removed from the conveyor belt by first scraping blade 110 to fall through frame 105 and thereby not accumulate on frame 105.

Conveyor belt cleaning apparatus 100 further includes a pair of frame mounting assemblies 200, which facilitate mounting frame 105 to a conveyor belt. Each frame mounting assembly 200 includes a frame support tube 210 secured to frame 105, a mounting arm 220 secured to frame support tube 210 and a support tube bracket clamp 230 secured to mounting arm 220. Mounting bracket 240 is secured to mounting arm 220 by support tube bracket clamp 230 and to the conveyor belt using mounting bracket bolt holes 248 and bolts (not shown). Clamp attachment openings 244 facilitate proper adjustment of first and second scraping blades 110 and 120, respectively, against the conveyor belt.

Frame 105 may be made of any suitable material including, for example, steel, aluminum, carbon graphite, iron or combinations thereof. In one embodiment frame 105 is made of stainless steel. In another embodiment frame 105 is made of aluminum. In still another embodiment frame 105 is made of carbon graphite. In yet another embodiment frame 105 is made of iron.

Frame 105 may include or more frame openings 160 which allow debris removed from the conveyor belt by first scraping blade 110 to fall through frame 105 and thereby not accumulate on frame 105. In certain embodiments frame 105 has one frame opening 160, while in other embodiments frame 105 has a plurality of frame openings 160. In one such embodiment frame 105 has two frame openings 160. The size and orientation of frame openings 160 should be such as to maximize debris clearance from frame 105 without having a significant adverse effect on the strength of frame 105.

The size of frame 105 may vary in accordance with the size of the conveyor belt to be cleaned. Typically, frame 105 is from 4 inches to 24 inches in length (i.e., from front to back) and from 12 inches to 96 inches in width (i.e., from side to side). In one embodiment frame 105 is from 8 inches to 16 inches in length and from 24 inches to 48 inches in width. In one such embodiment frame 105 is from 8 inches to 16 inches in length and about 24 inches in width. In another such embodiment frame 105 is from 8 inches to 16 inches in length and about 32 inches in width. In still another such embodiment frame 105 is from 8 inches to 16 inches in length and about 40 inches in width. In yet another such embodiment frame 105 is from 8 inches to 16 inches in length and about 48 inches in width. In certain such embodiments frame 105 is from 10 inches to 12 inches in length. For example, in one embodiment wherein frame 105 is 11 inches in length and 32 inches in width, frame 105 has two frame openings 160 located 1 inch apart from each other and each being 6 inches in length by 12 inches in width.

Figure 2:
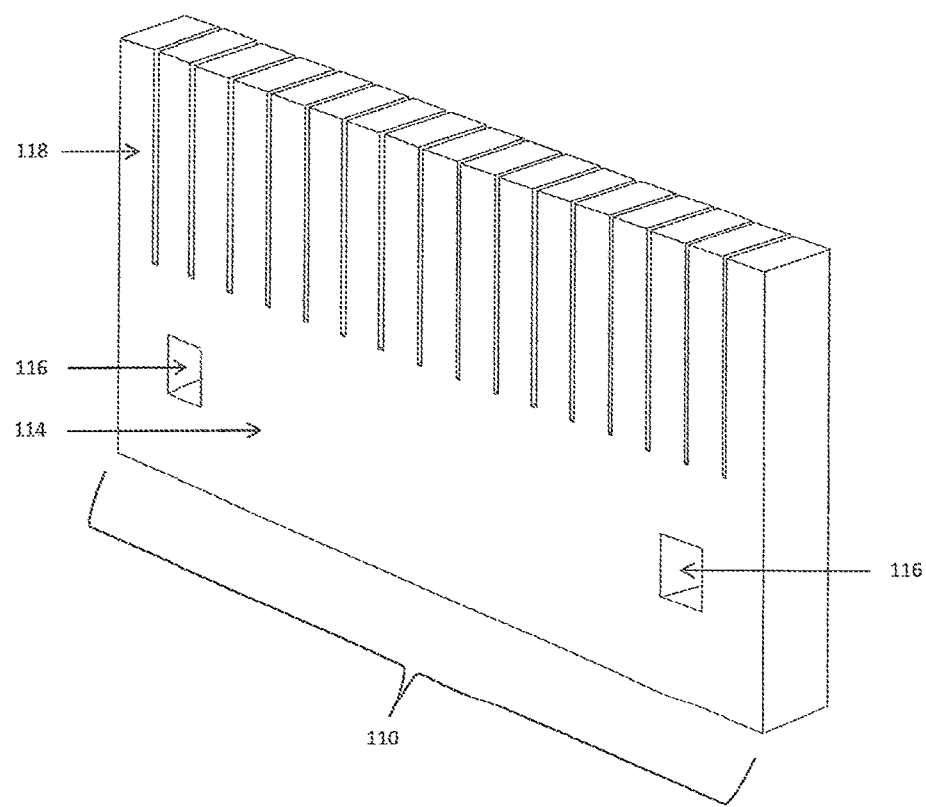

FIG. 2 is an enlarged view of scraping blade 110 of the present invention. Scraping blade 110 includes base 114 and fingers 118, and is attached to frame 105 using a pair of mounting plates 170 and mounting plate bolts 172 (see FIG. 1). Base 114 includes a pair of mounting plate bolt holes 116.

Scraping blades 110 and 120 may be made from any suitable flexible material having a durometer rating between 60 and 100. Ideally, such materials also are easily pourable into a mold at elevated temperatures and solidify upon cooling to room temperature. Such materials include, for example, polyurethane, rubber and mixtures thereof. In one embodiment each of scraping blades 110 and 120 is made of polyurethane. In one embodiment each of scraping blades 110 and 120 has a durometer rating of from 65 to 95. In one such embodiment each of scraping blades 110 and 120 has a durometer rating of from 85 to 95. In one such embodiment each of scraping blades 110 and 120 has a durometer rating of about 90.

As mentioned above, conveyor belt cleaning apparatus 100 may include a plurality of first scraping blades 110 positioned side-by-side, and a plurality of second scraping blades 120 similarly positioned side-by-side. Each scraping blade may be from 4 inches to 24 inches in width and from 4 inches to 16 inches in length. In one embodiment scraping blades 110 and 120 are 8 inches in width by 8 inches in length. In another embodiment scraping blades 110 and 120 are 12 inches in width by 8 inches in length. In still another embodiment scraping blades 110 and 120 are 12 inches in width by 12 inches in length.

As mentioned above, first and second scraping blades 110 and 120, respectively, are comprised of a base and a plurality of fingers. In certain embodiments the base and the corresponding plurality of fingers of a scraping blade are equal in length. Thus, in one embodiment scraping blades 110 and 120 are 8 inches in length by 8 inches in width, wherein the base of each of the blades is 4 inches in length and the corresponding fingers also are 4 inches in length. In certain embodiments the base of a scraping blade is greater in length than its corresponding fingers, and in other embodiments the fingers of a scraping blade are greater in length than their corresponding base. The distance between the fingers of a scraping blade may be from one-sixteenth of an inch to one-fourth. In one embodiment the distance between the fingers of scraping blades 110 and 120 is one-eighth of an inch. In another embodiment the distance between the fingers of scraping blades 110 and 120 is one-tenth of an inch. In another embodiment the distance between the fingers of scraping blades 110 and 120 is one-twelfth of an inch. The thickness of the scraping blades may be from one-eighth of an inch to 1.5 inches. In certain such embodiments the present invention includes scraping blades having a thickness of one-fourth inch to one inch. In certain embodiments the present invention includes scraping blades having a thickness of one-fourth inch to three-fourths inch. In one such embodiment the present invention includes scraping blades having a thickness of one-half inch.

In operation, the fingers of first and second scraping blades 110 and 120, respectively, contact the conveyor belt surface and specifically the cleated portion of the conveyor belt as the belt passes over conveyor belt cleaning apparatus 100. This effectively brushes much of the carry-back debris that is adhered to the conveyor belt to be removed from the conveyor belt before it returns to the loading zone, thereby reducing clogging and potential safety hazards for workers.

While particular embodiments of the present invention have been shown and described herein for purposes of illustration, it will be understood that the invention is not limited thereto. Modifications may be made by persons skilled in the art, particularly in light of the foregoing teachings, without deviating from the spirit and scope of the invention. Accordingly, the invention is not limited except as by the appended claims.

All of the U.S. patents and published U.S. patent applications referred to in this specification are incorporated herein by reference in their entirety to the extent not inconsistent with the present description.

What is claimed is:

1. A conveyor belt cleaning apparatus for cleaning a cleated type conveyor belt, comprising:
    (a) a frame having a front side, a rear side, two lateral sides and one or more openings located between said front side, said rear side and said lateral sides;
    (b) a first scraping blade and a second scraping blade, wherein each of said scraping blades is positioned between said lateral sides of said frame, and wherein said second scraping blade is rearward of said first scraping blade; and
    (c) means for securing said frame to the underside of a conveyor belt assembly such that said first scraping blade and said second scraping
    blade make contact with the conveyor belt of said conveyor belt assembly, wherein each scraping blade independently has a durometer rating of between 60 and 100, wherein each scraping blade comprises a base and a plurality of scraping blade fingers and wherein the scraping blade fingers are separated from each other by a distance of between about 0.0625 inches to about 0.25 inches.

2. The conveyor belt cleaning apparatus according to claim 1, wherein each of said first and second scraping blades is comprised of a flexible material having a durometer rating of from 60 to 100.

3. The conveyor belt cleaning apparatus according to claim 2, wherein said flexible material is polyurethane or rubber.

4. The conveyor belt cleaning apparatus according to claim 3, wherein said flexible material is polyurethane.

5. The conveyor belt cleaning apparatus according to claim 4, wherein said polyurethane has a durometer rating of from 65 to 95.

6. The conveyor belt cleaning apparatus according to claim 4, wherein said polyurethane has a durometer rating of from 85 to 95.

7. The conveyor belt cleaning apparatus according to claim 4, wherein said polyurethane has a durometer rating of about 90.

8. The conveyor belt cleaning apparatus according to claim 1, wherein said scraping blade fingers are separated from each other by a gap of about 0.125 inches.

9. The conveyor belt cleaning apparatus according to claim 1, wherein the base of each of said scraping blades is from 2 inches to 6 inches in length and said scraping blade fingers also are from 2 inches to 6 inches in length.

10. The conveyor belt cleaning apparatus according to claim 1, wherein the base of each of said scraping blades is from 3 inches to 5 inches in length and said scraping blade fingers also are from 3 inches to 5 inches in length.

11. The conveyor belt cleaning apparatus according to claim 1, wherein the base of each of said scraping blades is about 4 inches in length and said scraping blade fingers also are about 4 inches in length.

12. The conveyor belt cleaning apparatus according to claim 1, wherein the distance between said front side of said frame and said rear side of said frame is from 4 inches to 16 inches.

13. The conveyor belt cleaning apparatus according to claim 12, wherein the distance between said front side of said frame and said rear side of said frame is from 8 inches to 12 inches.

14. The conveyor belt cleaning apparatus according to claim 12, wherein the distance between said front side of said frame and said rear side of said frame is from 10 inches to 12 inches.

15. The conveyor belt cleaning apparatus according to claim 1, wherein the distance between said lateral sides of said frame is from 12 inches to 96 inches.

16. The conveyor belt cleaning apparatus according to claim 15, wherein the distance between said lateral sides of said frame is from 24 inches to 48 inches.

17. The conveyor belt cleaning apparatus according to claim 15, wherein the distance between said lateral sides of said frame is about 24 inches, about 32 inches, about 40 inches or about 48 inches.

18. The conveyor belt cleaning apparatus according to claim 1, wherein the total surface area of said one or more openings of said frame is at least one-half the total surface area of said frame.

* * * * *